United States Patent [19]

Bryant et al.

[11] Patent Number: 5,082,313

[45] Date of Patent: Jan. 21, 1992

[54] CUT-IN REPAIR COUPLING

[76] Inventors: Donald Bryant, 2420 Lavender La.; Thomas K. Archer, 4706 Glenlea, both of Texarkana, Ark. 75502

[21] Appl. No.: 619,661

[22] Filed: Nov. 28, 1990

Related U.S. Application Data

[63] Continuation of Ser. No. 415,422, Sep. 29, 1989, abandoned, which is a continuation of Ser. No. 831,208, Feb. 20, 1986, abandoned.

[51] Int. Cl.$^5$ .............................................. F16L 17/00
[52] U.S. Cl. .................................... 285/15; 285/331; 285/31
[58] Field of Search ............... 285/15, 16, 17, 337, 285/331, 177, 31

[56] References Cited

U.S. PATENT DOCUMENTS

| | | | |
|---|---|---|---|
| 1,200,118 | 10/1916 | Keeler | 285/331 |
| 1,389,004 | 8/1921 | Johnston | 285/331 |
| 1,681,301 | 8/1928 | Tolman | 285/16 |
| 1,921,400 | 8/1933 | Weber | 285/337 |
| 2,268,263 | 12/1941 | Newell et al. | 285/15 |
| 2,305,668 | 12/1942 | Bruno | 285/331 |
| 3,547,471 | 12/1970 | Dunmire | 285/337 |
| 3,776,577 | 12/1973 | Dickey | 285/31 |
| 3,782,683 | 1/1974 | Lee et al. | 285/16 |
| 4,648,631 | 3/1987 | Bryant | 285/337 |

FOREIGN PATENT DOCUMENTS

| | | | |
|---|---|---|---|
| 1300382 | 7/1969 | Fed. Rep. of Germany | 285/31 |
| 1117802 | 7/1968 | United Kingdom | 285/31 |

Primary Examiner—Eric K. Nicholson
Attorney, Agent, or Firm—Lorusso & Loud

[57] ABSTRACT

A cut-in repair coupling for connecting two free ends of a pipeline from which a section of pipe has been removed. The coupling includes a first sleeve and second sleeve which telescopically fit over the free ends of the pipeline, each of the sleeves being of an axial length less than the length of the section of pipe being repaired and the sum of the lengths of the sleeves being greater than the section of pipe being repaired. The coupling further includes two glands with sealing members therein used in conjunction with a nut and bolt assembly to tightly seal and make-up the repair coupling.

5 Claims, 1 Drawing Sheet

CUT-IN REPAIR COUPLING

This is a continuation of copending application Ser. No. 07/415,422 filed on Sept. 29, 1989 now abandoned which is a continuation of Ser. No. 06/831,208 filed on Feb. 20, 1986, now abandoned.

FIELD OF THE INVENTION

This invention relates to repair couplings for pipelines and in particular couplings for replacing a section which has been cut out of an established pipeline.

DESCRIPTION OF THE PRIOR ART

In existing pipelines leaks often occur after some period of use due to corrosion or other reasons. If a leak is localized and restricted to a limited length of pipe, that length of pipe may be cut out and a repair coupling may be used to sealingly connect the two free ends of the pipe which remain after the cut out portion has been removed. Typical of cut-in coupling in current use are the couplings shown in the U.S. Pat. No. 3,782,683 to Lee and Bulletin CC-431 8/81 published by Rockwell International Corporation. These couplings are comprised of two sleeve members, each of which is sealingly secured to one of the free ends of the pipe adjacent the cut out section. The free ends of the two sleeves are each received in a separate double faced gland located in the space from which the damaged section of the pipe has been removed. Such couplings are unnecessarily complicated, expensive to manufacture and difficult to install in the field.

SUMMARY OF THE INVENTION

The invention herein disclosed provides a coupling in which the cost to manufacture is significantly reduced over the couplings of the prior art and is relatively easy to install in the field. It is comprised of two sleeve members, each one of which is installed on a remaining portion of the pipeline from which a section has been removed. Each of the sleeves are of a length which is less than the cut out portion of the pipeline so that they may be easily installed one each on the adjacent sections of the established pipe. Glands are provided to seal the sleeves to the remaining sections of the established pipe and a socket is integrally formed at the opposite end of one of the sleeve members into which is sealingly received the opposite end of the other sleeve member. The prior art as exemplified in the aforementioned patent to Lee and Bulletin employs two sleeves, each of which are of an axial dimension no greater than the cut out section of the pipe. However, a double faced gland is employed in which the adjoining ends of the repair sleeve are sealingly received. In the instant invention this double faced gland is eliminated by virtue of a socket formed integrally on the end of one of the repair sleeves. This represents a considerable saving in production as well as in the amount of inventory that must be stocked, both by the manufacturer and distributors.

DESCRIPTION OF THE PREFERRED EMBODIMENT

Figure 1:
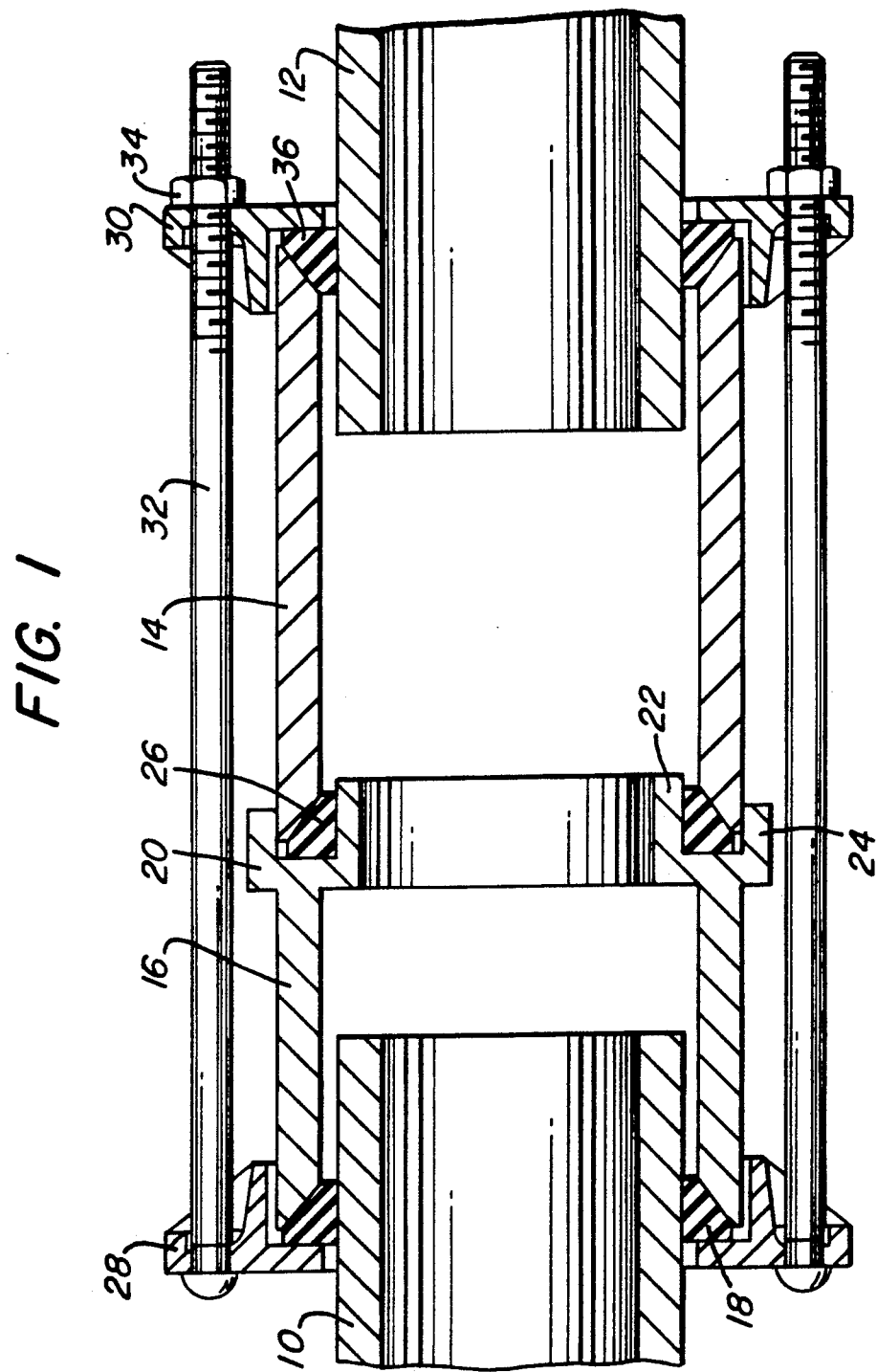
FIG. 1 is an elevation cross-section of the invention herein described.

FIG. 1 shows a pipeline from which a section has been removed leaving free ends 10 and 12. A gland or follower 28 and the beveled end of a sleeve 16 are loosely received over the end 10. An annular gasket 18 of elastomeric material is mounted between the beveled end of sleeve 16 and the gland 28 to sealingly engage the pipe 10, sleeve 16 and gland 28 when compressed in the assembly. Similarly at the other free end 12, one end of a sleeve 14 and a gland 30 are loosely received over the end 12 with a gasket or sealing ring 36 sealingly engaging the sleeve 14, gland 30 and the pipe end 12 in the assembly. Sleeves 14 and 16 are of an axial length to be easily received between the two pipe ends 10 and 12. As may be sen in FIG. 1, the sleeve 16 is of substantially less axial length than the sleeve 14.

A socket 20 comprised of radially spaced annular walls 20 and 22 is integrally formed on the end of sleeve 16 which is remote from the gland 28. The end of sleeve 14 which is remote from the gland 30 is beveled and is received within the socket 20 with a gasket 26. The inner annular wall 22 is of greater axial length than outer annular wall 24. This provides a projection on which the bevelled end of the sleeve may be "piloted" to facilitate installation as well as an adequate surface on the exterior of wall 22 for sealing engagement with seal 26. First and second bolts 32 extend between the first and second glands 28 and 30 and serve to axially compress the assembly together when the first and second nuts 34 are tightened down on the threaded end of the bolts. As may be seen in FIG. 1, the bolts 32 interconnect only the glands 28, 30 and are removed from the sleeves 14, 16. The outer surface of the outer radial wall forming the socket 20 is devoid of projections, permitting the bolts 32 to closely overlie the radial outer wall without interference.

It will be observed from the prior art and the instant invention that cut-in couplings are of necessity comprised of two sleeves the axial dimension of which is no greater than the cut out space between the ends of the two pipes from which the damage section of pipe has been removed. Obviously a single sleeve cannot be used for a cut-in repair coupling where the free ends of the pipe are rigid and cannot be moved, since if its length were such to be received within the space between the two free ends of the pipe from which the damaged section has been removed, its axial length would not be sufficient to bridge the cut out section. In the present invention, the sleeve 16 is relatively short in length to facilitate its easy handling and installation and movement on the pipe 10 to accommodate to the longer and more cumbersome sleeve 14.

To install the assembly shown in FIG. 1, the damaged section of the pipe is first removed leaving free ends 10 and 12. Glands 28 and 30 and gaskets 18 and 36 are mounted on free ends 10 and 12 respectively. Next the sleeve 14 is telescoped over free end 12 and with the sleeve and the gland 30 being moved sufficiently axially along the free end 12 so that there is sufficient space between the end of the sleeve which is remote from the gland 30 to allow insertion of the sleeve 16 into the space between the sleeve 14 and the free end 10 and to telescopically mount it over the free end 10. The seal 26 is inserted into the socket 20 and the glands and sleeves are then moved toward each other until the free end of sleeve 14 is received into the socket 20. As the sleeves are moved toward each other the extended wall 22 of the socket guides the free end of the sleeve 14 into the socket. The bolts 32 are then inserted through aligned openings in the gland 28 and 30 and the entire assembly is axially compressed by nuts 34. Referring to FIG. 1, it will be seen that the heads of the bolts 32 are wholly disposed on the gland 28 and the nuts 34 are wholly disposed on the gland 30, such that in operation the assembly may be drawn to its operative configuration by an operator tightening the nuts at a single location, that is, at one end of the coupling assembly. As the gland and sleeves are axially compressed the gaskets 18 and 36 will seal the sleeves to the free end of the pipe and the adjoining ends of the sleeve 14 and 16 will be sealingly joined in the socket 20 by means of gasket 26.

It will be apparent from the above, that by loosening the nuts 34 and removing the nuts 34 and the bolts 32, the coupling readily may be removed from the pipeline.

We claim:

1. A cut-in repair coupling for connecting first and second free ends of a pipeline from which a section of pipe has been removed, said coupling comprising a one-piece first sleeve adapted to be placed around said first free end, said first sleeve being of cylindrical configuration on the interior and exterior surfaces thereof, a first end of said one-piece first sleeve having radially spaced annular walls defining therebetween a single annular socket integrally formed as part of said first end of said first sleeve, said coupling further comprising a second sleeve adapted to be placed around said second free end, said second sleeve being of cylindrical configuration on the interior and exterior surfaces thereof, each of said sleeves being of an axial length less than the length of the removed section of pipe, the sum of the axial lengths of said first and second sleeves being greater than the axial length of the removed section, first means to seal a second end of said first sleeve to the pipeline adjacent said first free end, said first sealing means comprising a first gland, said first gland having a first annular wall extending in a direction towards said second free end to define between said first annular wall and said first free end of said pipeline a first annular compartment, first gasket means disposed in said first annular compartment, said first annular compartment being adapted to receive said second end of said first one-piece sleeve such that said second end of said first sleeve engages said first gasket means, second means to seal a first end of said second sleeve to the pipeline adjacent said second free end, said second sealing means comprising a second gland, said second gland having a second annular wall extending in a direction towards said first gland to define between said second annular wall and said second free end of said pipeline a second annular compartment, second gasket means disposed in said second annular compartment, said second annular compartment being adapted to receive said first end of said second sleeve such that said first end of said second sleeve engages said second gasket means, first and second bolts adapted to interconnect said first and second glands, and first and second nuts for mounting, respectively, on said first and second bolts, said first and second glands being adapted to be drawn toward each other by said first and second bolts and said first and second nuts, said single annular socket integrally formed with the first end of said first sleeve having an opening adapted to receive a second end of said second sleeve, a third sealing means disposed in said annular socket and adapted to be engaged by said second end of said second sleeve, said radially spaced annular walls comprising inner and outer annular walls, said inner annular wall being of greater axial length than said outer annular wall, an outer surface of said outer annular wall being devoid of protuberances, whereby upon said drawing together of said first and second glands, and first gasket means is compressed between said first gland and said second end of said first sleeve, said second gasket means is compressed between said second gland and said first end of said second sleeve, and said third gasket means is compressed between said first end of said first sleeve and said second end of said second sleeve.

2. The coupling according to claim 1 in which said first sleeve is of an axial length less than the axial length of said second sleeve.

3. The coupling according to claim 1 in which said bolts are removed from said sleeves and are attached to said coupling only at said first and second glands.

4. The coupling according to claim 3 in which said bolt heads are wholly disposed on one of said glands and said nuts are wholly disposed on the other of said glands.

5. The coupling according to claim 1 in which said glands and said sleeves are readily releasable from said pipeline free ends by operation of said nuts and bolts.

* * * * *